United States Patent
Seol et al.

(10) Patent No.: US 12,062,843 B2
(45) Date of Patent: Aug. 13, 2024

(54) ELECTRONIC DEVICE INCLUDING ANTENNA

(71) Applicant: Samsung Electronics Co., Ltd., Suwon-si (KR)

(72) Inventors: Kyungmoon Seol, Suwon-si (KR); Hyunsuk Kim, Suwon-si (KR); Seongyong An, Suwon-si (KR); Hojin Jung, Suwon-si (KR); Jaebong Chun, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 17/821,109

(22) Filed: Aug. 19, 2022

(65) Prior Publication Data
US 2022/0393343 A1   Dec. 8, 2022

Related U.S. Application Data

(63) Continuation of application No. PCT/KR2021/018259, filed on Dec. 3, 2021.

(30) Foreign Application Priority Data

Dec. 4, 2020   (KR) .................. 10-2020-0168770
Dec. 14, 2020  (KR) .................. 10-2020-0174788

(51) Int. Cl.
*H01Q 1/24*   (2006.01)
*H01Q 1/38*   (2006.01)

(52) U.S. Cl.
CPC .............. *H01Q 1/38* (2013.01); *H01Q 1/241* (2013.01)

(58) Field of Classification Search
CPC ................................. H01Q 1/38; H01Q 1/241
See application file for complete search history.

(56) References Cited

U.S. PATENT DOCUMENTS

| | | |
|---|---|---|
| 6,388,626 B1 | 5/2002 | Gamalielsson et al. |
| 10,175,792 B2 | 1/2019 | Kim et al. |

(Continued)

FOREIGN PATENT DOCUMENTS

| | | |
|---|---|---|
| KR | 10-2001-0021595 A | 3/2001 |
| KR | 10-2014-0105886 A | 9/2014 |

(Continued)

OTHER PUBLICATIONS

International Search Report and Written Opinion of the International Searching Authority dated Mar. 24, 2022, in connection with International Application No. PCT/KR2021/018259, 12 pages.

(Continued)

*Primary Examiner* — Dieu Hien T Duong

(57) ABSTRACT

An electronic device of various embodiments of the present disclosure may include a housing, a cylindrical support member disposed in the housing, a first printed circuit board disposed in the housing, a first antenna disposed in the housing, and a first wireless communication circuit disposed on the first printed circuit board. The housing may include a first surface, a second surface parallel to the first surface, and a side surface surrounding at least one portion of a space between the first surface and the second surface. The side surface may include a first side surface and a second side surface forming an angle with the first side surface at a first edge. The first antenna may be disposed adjacent to at least one portion of the first edge and spaced apart from the cylindrical support member by a predetermined distance.

(Continued)

The first wireless communication circuit may be configured to feed power to the first antenna and transmit and receive a signal of a frequency band.

20 Claims, 16 Drawing Sheets

(56) References Cited

U.S. PATENT DOCUMENTS

| | | |
|---|---|---|
| 2005/0159196 A1* | 7/2005 | Fang .................... H01Q 9/0421 455/575.1 |
| 2012/0204453 A1 | 8/2012 | Jung |
| 2014/0133019 A1 | 5/2014 | Mullet et al. |
| 2017/0212607 A1 | 7/2017 | Yoon |
| 2018/0358684 A1 | 12/2018 | Chun et al. |
| 2020/0097047 A1 | 3/2020 | Myoung |
| 2020/0209924 A1 | 7/2020 | Zuo |
| 2021/0135492 A1 | 5/2021 | Kim et al. |
| 2021/0320429 A1 | 10/2021 | Takayama et al. |
| 2021/0363822 A1* | 11/2021 | Blair ........................ E06B 9/62 |

FOREIGN PATENT DOCUMENTS

| | | |
|---|---|---|
| KR | 10-2016-0098677 A | 8/2016 |
| KR | 10-2017-0062121 A | 6/2017 |
| KR | 10-2017-0089664 A | 8/2017 |
| KR | 10-2019-0115888 A | 10/2019 |
| KR | 10-2020-0054674 A | 5/2020 |
| KR | 10-2020-0119654 A | 10/2020 |
| WO | 2018126563 A1 | 7/2018 |
| WO | 2020138448 A1 | 7/2020 |

OTHER PUBLICATIONS

Supplementary European Search Report dated Mar. 22. 2024 , in connection with European Patent Application No. 21901081.6 , 12 pages.

* cited by examiner

ELECTRONIC DEVICE INCLUDING ANTENNA

CROSS-REFERENCE TO RELATED APPLICATIONS

This application is a Bypass Continuation of International Application No. PCT/KR2021/018259, filed Dec. 3, 2021, which claims priority to Korean Patent Application No. 10-2020-0168770, filed Dec. 4, 2020, and Korean Patent Application No. 10-2020-0174788, filed Dec. 14, 2020, the disclosures of which are herein incorporated by reference in their entirety.

BACKGROUND

1. Field

Embodiments disclosed in the present document relate to an electronic device including an antenna.

2. Description of Related Art

An electronic device may include a display to have a larger area so as to provide a wide screen. However, as the display becomes larger, even a size of the electronic device increases, so there may be a limit in the size of the display. In order to overcome this limit, a rollable electronic device as a next-generation display device may include a flexible display. The flexible display may be selectively introduced into a housing, and through this, the flexible display may have a large area for providing a large screen while maintaining the size of the electronic device.

Meantime, an electronic device having a communication function may include a plurality of antennas in order to provide mobile communication services of different frequency bands by using one electronic device even while miniaturized and light-weighted. For example, a multi-input multi-output (MIMO) technique is defined in IEEE 802.11n, IEEE 802.11ac, and IEEE 802.11ax standards, and a 2G/3G/4G/5G related MIMO antenna may be included in the electronic device.

SUMMARY

A rollable electronic device may include a conductive component (e.g., a support member) in a housing. On the other hand, the rollable electronic device may include an antenna in the housing, and the antenna has to secure a separation distance greater than or equal to a specified distance from the conductive component in order to secure performance. However, as the rollable electronic device is miniaturized, it is becoming difficult to secure the separation distance between the conductive component (e.g., the support member) within the housing and the antenna.

According to various embodiments disclosed in the present document, a first part and a second part of a housing of a rollable electronic device may form a specific angle at a first edge, and an antenna may be disposed adjacent to the first edge and secure a separation distance greater than or equal to a specified distance from a conductive component (e.g., a support member).

An electronic device of various embodiments of the present disclosure may include a housing, a cylindrical support member disposed within the housing, a first printed circuit board disposed within the housing, a first antenna disposed within the housing, and a first wireless communication circuit disposed on the first printed circuit board. The housing may include a first surface, a second surface parallel to the first surface, and a side surface surrounding at least one portion of a space between the first surface and the second surface. The side surface may include a first side surface and a second side surface forming an angle with the first side surface at a first edge. The first antenna may be disposed adjacent to at least one portion of the first edge and spaced apart from the cylindrical support member by a predetermined distance or more. The first wireless communication circuit may feed power to the first antenna and transmit and/or receive a signal of a frequency band.

An electronic device of various embodiments of the present disclosure may include a housing, a cylindrical support member disposed within the housing, a printed circuit board disposed within the housing in parallel to the first surface, an antenna disposed within the housing, and a wireless communication circuit disposed on the printed circuit board. The housing may include a first surface, a second surface parallel to the first surface, and a side surface surrounding the first surface and the second surface. The first surface of the housing may have a first vertex and the second surface may have a second vertex. The side surface may include a first edge connecting the first vertex of the first surface and the second vertex of the second surface corresponding to the first vertex. The antenna may be disposed adjacent to at least one portion of the first edge and spaced apart from the cylindrical support member by a predetermined distance or more. The wireless communication circuit may feed power to the antenna and transmit and/or receive a signal of a frequency band.

An electronic device of various embodiments of the present disclosure may include a metal housing, a cylindrical support member disposed within the metal housing, a printed circuit board disposed in parallel to the first surface within the metal housing, and a wireless communication circuit disposed on the printed circuit board. The metal housing may include a first surface, a second surface parallel to the first surface, and a side surface surrounding at least one portion of a space between the first surface and the second surface. The side surface may include a first side surface and a second side surface forming an angle with the first side surface at a first edge. A first part of the metal housing including the first edge may be spaced apart from the cylindrical support member by a specified distance or more. The wireless communication circuit may feed power to the first part and transmit and/or receive a signal of a specified frequency band.

According to various embodiments disclosed in the present document, a rollable electronic device may secure a separation distance between an antenna and a conductive component including the ground and reduce a deterioration of the radiation performance of the antenna.

Also, according to various embodiments, the rollable electronic device may include additional printed circuit boards and/or additional antennas within the housing, and as a wireless communication circuit disposed on the additional printed circuit boards feeds power to the additional antenna, a multiple band for providing various functions may be implemented.

In addition, various effects directly or indirectly identified through the present document may be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present invention will be described below with reference to the accompanying drawings. However, this is not intended to limit the present invention to specific embodiments, and it should be understood that various modifications, equivalents, or alternatives of embodiments of the present invention are included.

Figure 1:
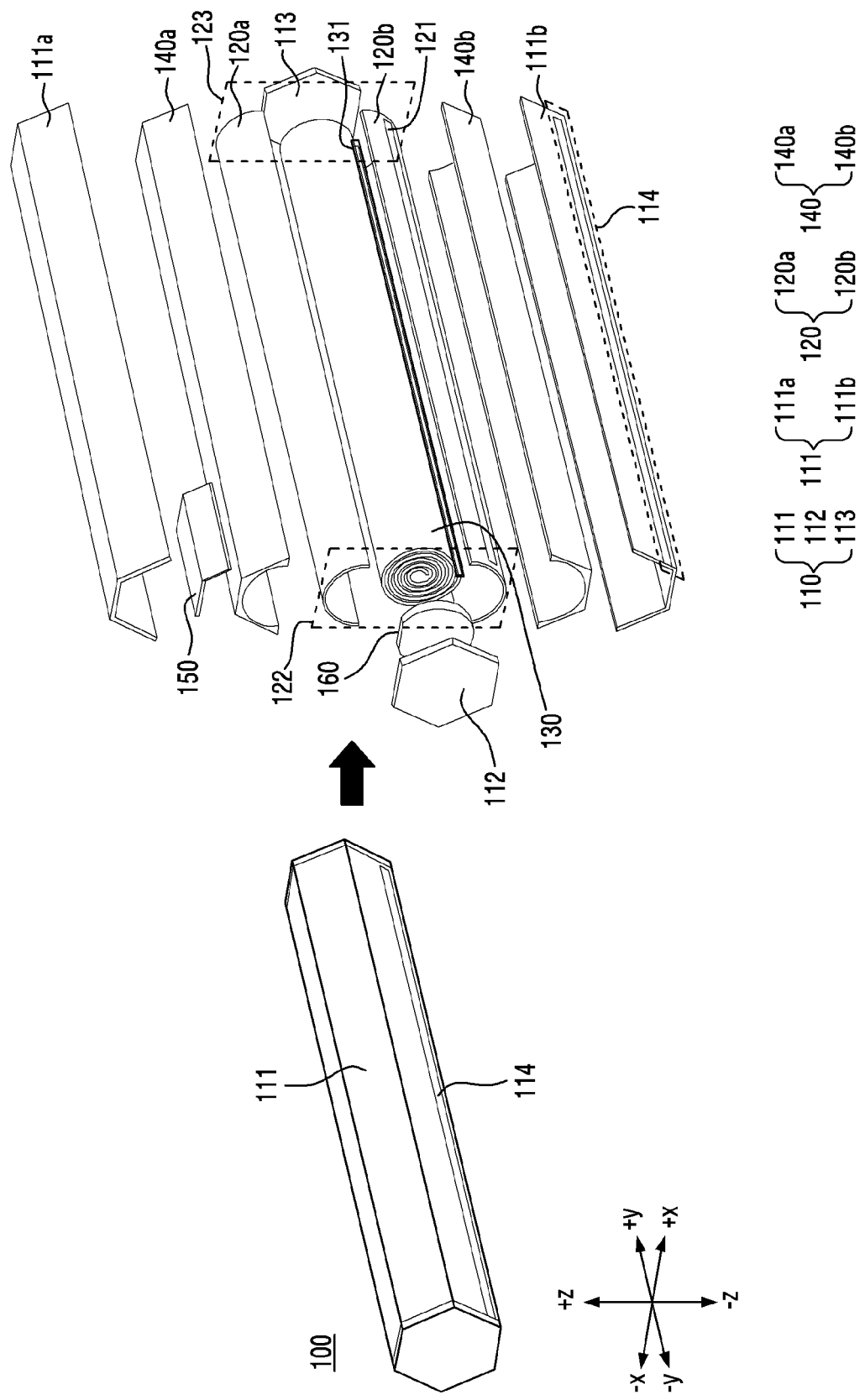
FIG. 1 is a perspective view and an exploded view of an electronic device according to an embodiment.

FIG. 1 is a perspective view and an exploded view of an electronic device according to an embodiment.

Referring to FIG. 1, according to an embodiment, the electronic device 100 may include a housing 110 that forms an exterior of the electronic device 100, a support member 120, a flexible display 130, an antenna carrier 140, a first antenna 150 and/or a first printed circuit board 160.

According to an embodiment, the housing 110 may include a first housing 111, a second housing 112, and/or a third housing 113. In an embodiment, at least two of the first housing 111, the second housing 112, and the third housing 113 may be integrally formed. In an embodiment, the housing 110 may include a first groove 114 for introducing or withdrawing the flexible display 130. In an embodiment, a description has been made in which the housing 110 includes the first housing 111, the second housing 112, and the third housing 113, but this may be also described as the housing 110 includes a first part 111, a second part 112, and a third part 113.

In an embodiment, the second housing 112 and/or the third housing 113 may have a regular hexagonal structure having six vertices. For example, the second housing 112 may include a first vertex, a second vertex, a third vertex, a fourth vertex, a fifth vertex, and a sixth vertex. For another example, the second housing 112 may include a first edge extending linearly from the first vertex to the second vertex, a second edge extending linearly from the second vertex to the third vertex, a third edge extending linearly from the third vertex to the fourth vertex, a fourth edge extending linearly from the fourth vertex to the fifth vertex, a fifth edge extending linearly from the fifth vertex to the sixth vertex, and a sixth edge extending linearly from the sixth vertex to the first vertex.

The second housing 112 and the third housing 113 shown in FIG. 1 have been expressed as regular hexagons whose edges have substantially the same length, but are not limited thereto, and the edges of the second housing 112 and/or the third housing 113 may have the same length or different lengths.

According to another embodiment, the second housing 112 and/or the third housing 113 may have a structure having at least one vertex in addition to the hexagonal structure. For example, the second housing 112 may include a first vertex, a second vertex, and a third vertex. Also, the second housing 112 may include a first edge extending linearly from the first vertex to the second vertex, a second edge extending linearly from the second vertex to the third vertex, and a third edge extending linearly from the third vertex to the first vertex. In this case, the second housing 112 may have a triangular structure. In an example, the lengths of the first edge, the second edge and/or the third edge may be different.

For another example, the second housing 112 may include a first vertex, a second vertex, and a third vertex, and may extend linearly from the first vertex to the second vertex, and may extend curvedly from the second vertex to the third vertex, and may extend linearly from the third vertex to the first vertex. In this case, a cross section of the second housing 112 may have an arc shape.

According to an embodiment, the first housing 111 may include an upper housing 111*a* and/or a lower housing 111*b*. In an embodiment, the first housing 111 may surround a space between the second housing 112 and the third housing 113 and form a side surface of the electronic device 100.

According to another embodiment, the upper housing 111*a* and the lower housing 111*b* may be integrally formed.

According to an embodiment, the first housing 111 may have a structure including at least one edge. For example, the second housing 112 may have a regular hexagonal structure having six vertices, and the third housing 113 may have a regular hexagonal structure having six vertices. In an example, the first housing 111 may include six edges that connect the six vertices of the second housing 112 and the six vertices of the third housing 113 corresponding thereto, respectively. In this case, the first housing 111 may have a hexagonal pillar shape.

According to an embodiment, the electronic device 100 may include the support member 120 disposed in the housing 110. In an embodiment, at least one portion of the support member 120 may include a conductive material (e.g., a metal). The at least one portion of the support member 120 may include the ground or may be electrically connected to the ground.

According to an embodiment, at least one portion of the flexible display 130 may be located in an inner space formed by the support member 120.

According to another embodiment, a plurality of electronic components may be disposed in the inner space formed by the support member 120, and the flexible display 130 may be wound along an outer surface of the support member 120 and disposed.

According to an embodiment, the support member 120 may have a cylindrical shape. According to another embodiment, the support member 120 may have various shapes in which the flexible display 130 may be located. For example, the support member 120 may have a polygonal pillar shape including at least one edge.

According to an embodiment, the support member 120 may include a first support member 120*a* and a second support member 120*b*. In an embodiment, the second support member 120*b* may include a second groove 121 for introducing or withdrawing the flexible display 130 in its one part.

According to an embodiment, at least one portion of the flexible display 130 may be pulled out of or extended from the inside of the support member 120 and the housing 110, or may be introduced into or reside within the inside of the support member 120 and the housing 110. For example, the at least one portion of the flexible display 130 may be pulled out or extended from of the support member 120 through the second groove 121 of the support member 120, and may be pulled out of or extended from the housing 110 through the first groove 114 of the housing 110. In this case, the at least one portion of the flexible display 130 may be viewed from the outside.

According to an embodiment, the flexible display 130 may emit light from a pixel in order to transmit information to a user, and the light emitted from the pixel may be transmitted to the outside of the electronic device 100 through the flexible display 130. In an embodiment, the flexible display 130 may include a protective layer such as tempered glass.

According to an embodiment, a bezel 131 may be disposed on one edge of the flexible display 130. In an embodiment, when at least one portion of the flexible display 130 is pulled out of or extended from the housing 110, a user may grip the bezel 131.

According to an embodiment, the antenna carrier 140 may be disposed between the first housing 111 and the support member 120. In an embodiment, the antenna carrier 140 may support the first antenna 150 disposed in the housing 110. In an embodiment, the antenna carrier 140 may be formed of an injection member (e.g., plastic resin).

According to an embodiment, the antenna carrier 140 may include a first antenna carrier 140*a* and a second antenna carrier 140*b*. According to another embodiment, the first antenna carrier 140*a* and the second antenna carrier 140*b* may be integrally formed.

According to an embodiment, the first antenna 150 may include a conductive pattern, and the conductive pattern may be formed by various methods. For example, the conductive pattern may be formed by a laser direct structuring (LDS) method. For another example, the conductive pattern may be formed by STS (stainless steel) and/or vapor deposition. For further example, the electronic device 100 may include a flexible printed circuit board (FPCB) disposed in the housing 110 correspondingly to one edge (e.g., a first edge 321 of FIG. 3) of the first housing 111, and the first antenna 150 may be formed on the flexible printed circuit board (FPCB).

According to an embodiment, the first antenna 150 may include various types of antenna structures. For example, the first antenna 330 may include a slot antenna, a patch antenna, a dipole antenna, a monopole antenna, a loop antenna, an inverted-F antenna, a planar inverted-F antenna, and/or an antenna structure with a combination of any two or more of them.

According to an embodiment, the first printed circuit board 160 may be disposed in the housing 110 substantially in parallel to the second housing 112. In an embodiment, a plurality of electronic components (e.g., a wireless communication circuit and/or a processor) may be disposed on the first printed circuit board 160.

According to an embodiment, the first printed circuit board 160 may be disposed on a first end 122 of the support member 120. For example, the first printed circuit board 160 may have a shape (e.g., a circular shape) corresponding to a circumference of the first end 122 of the support member 120, and may be disposed at the first end 122 of the support member 120. In another embodiment, the electronic device 100 may further include an additional printed circuit board, and the additional printed circuit board may be disposed at a second end 123 of the support member 120. In further embodiment, the first printed circuit board 160 or the additional printed circuit board may be located in an inner space of the support member 120 as well.

Figure 2:
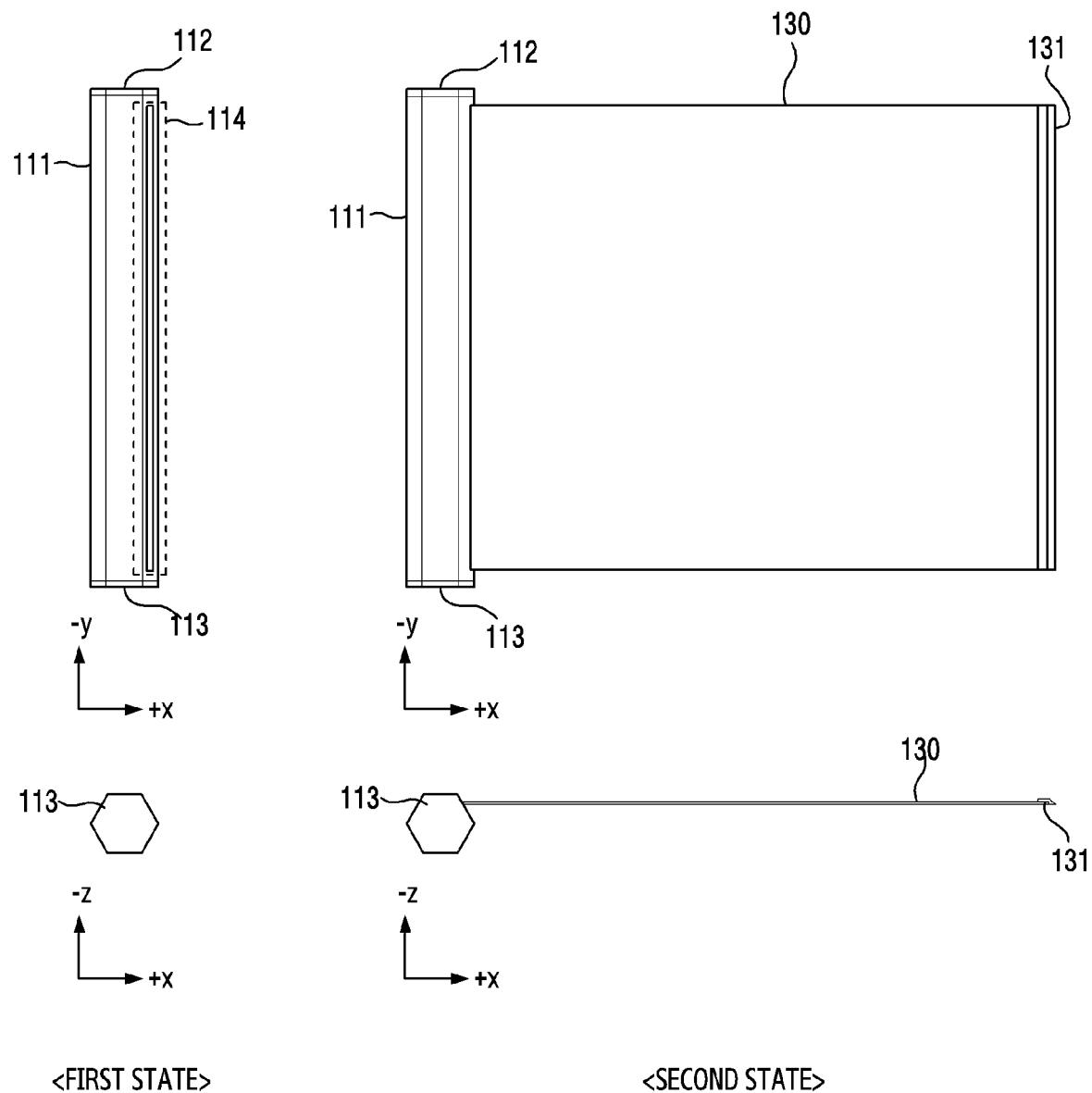
FIG. 2 is a diagram illustrating an electronic device when the electronic device is in a first state or a second state.

FIG. 2 is a diagram illustrating an electronic device when the electronic device is in a first state or a second state.

According to an embodiment, the electronic device 100 may have the first state or the second state.

According to an embodiment, the first state of the electronic device 100 may mean a state in which the flexible display 130 is introduced into the housing 110. In this case, as shown in FIG. 1, at least one portion of the flexible display 130 may be disposed in the support member 120 disposed within the housing 110. For another example, the first state may mean a state in which the flexible display 130 is visually unseen from the outside.

In an embodiment, the second state of the electronic device 100 may mean a state in which at least one portion of the flexible display 130 is pulled out of or extended from the outside of the housing 110. In this case, as described above, the flexible display 130 may be pulled out through or extended from the second groove 121 of the support member 120 and the first groove 114 of the housing 110. For another example, the second state may mean a state in which the at least one portion of the flexible display 130 is visually seen from the outside.

According to an embodiment, the electronic device 100 may be changed between the first state and the second state by an interaction of a user or a mechanical operation.

According to another embodiment, the electronic device 100 may include a button in one part of the housing 110, and when a user touches the button or applies a predetermined pressure to the button, the electronic device may be changed from the first state to the second state, or may be changed from the second state to the first state.

Figure 3:
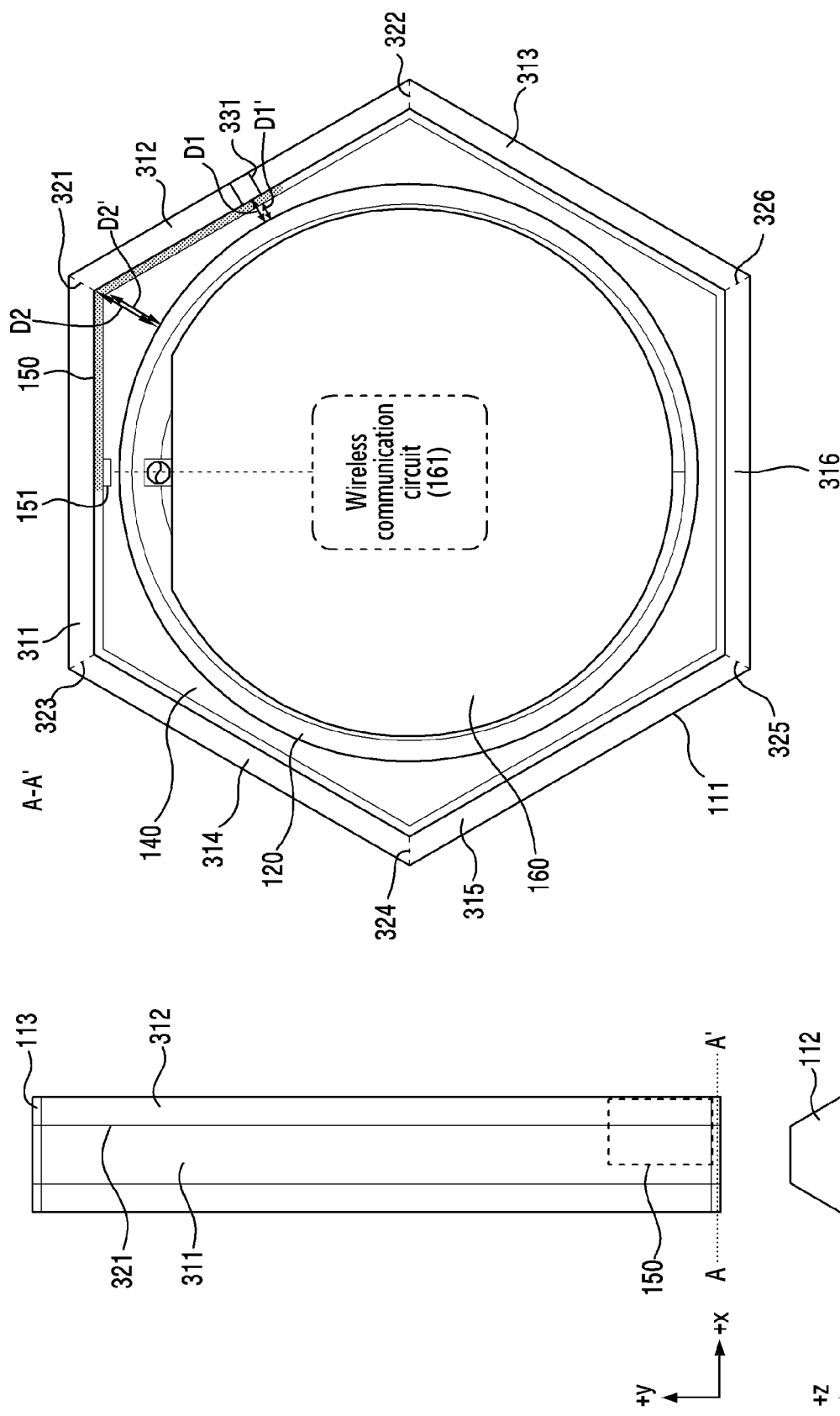
FIG. 3 is a diagram illustrating a polygonal structure of a housing and an antenna arrangement according to an embodiment.

FIG. 3 is a diagram illustrating a polygonal structure of a housing and an antenna arrangement according to an embodiment.

Referring to FIG. 3, according to an embodiment, a first part 311 and a second part 312 of the first housing 111 may form a specific angle at a first edge 321.

According to an embodiment, the electronic device 100 may include a wireless communication circuit 161, and the wireless communication circuit 161 may be disposed on the first printed circuit board 160. In an embodiment, the wireless communication circuit 161 may feed power to a point of a contact structure 151 connected to the first antenna 150, and transmit and/or receive an RF signal of a specified frequency band.

According to an embodiment, the first housing 111 may have a different vertical distance from the support member 120 according to its location. For example, a vertical distance from a first point 331 of the first housing 111 to the support member 120 may correspond to a first separation distance (D1), and a vertical distance from a first edge 321 of the first housing 111 to the support member 120 may correspond to a second separation distance (D2).

In an embodiment, a vertical distance from one part of the first antenna 150 disposed under the first point 331 to the support member 120 may correspond to a first antenna separation distance (D1'). In an embodiment, a vertical distance from a part of the first antenna 150 disposed at the first edge 321 to the support member 120 may correspond to a second antenna separation distance (D2').

In FIG. 3, it is illustrated that the first antenna 150 has a predetermined thickness and the antenna separation distances (D1' and D2') and the separation distances (D1 and D2) are distinguished, but when the thickness of the first antenna 150 is negligible compared to the separation distance, the antenna separation distances (D1' and D2') and the separation distances (D1 and D2) may be substantially the same as each other. Accordingly, a description is made below on the premise that the separation distance between the housing and the support member is substantially the same as the separation distance between the antenna disposed along the housing and the support member.

The first antenna 150 may be spaced apart from a conductive member such as the ground by a specified distance or more in order to secure radiation performance. In this case, the specified distance may be equal to or greater than ¼ wavelength (λ/4) of a wavelength corresponding to a frequency band at which the first antenna 150 transmits or receives.

According to an embodiment, the first antenna separation distance (D1') and the second antenna separation distance (D2') are ¼ wavelength (λ/4) or more of a wavelength corresponding to a frequency band at which the first antenna 150 transmits and/or receives. Accordingly, as the first antenna 150 is disposed in one region including the first edge 321, the electronic device 100 may secure a separation distance for reducing antenna performance degradation.

On the other hand, a part of the first antenna 150 disposed at the first edge may have the second antenna separation distance (D2') longer than the first antenna separation distance (D1') and, through this, the first antenna 150 may improve radiation performance compared to the case of having only the first antenna separation distance (D1').

According to an embodiment, the second part 312 and a third part 313 of the first housing 111 may form a specific angle at a second edge 322. For another example, the first part 311 and a fourth part 314 of the first housing 111 may form a specific angle at a third edge 323, and the fourth part 314 and a fifth part 315 of the first housing 111 may form an angle at a fourth edge 324, and the fifth part 315 and a sixth part 316 of the first housing 111 may form a specific angle at a fifth edge 325, and the sixth part 316 and the third part 313 of the first housing 111 may form a specific angle at a sixth edge 326.

In FIG. 3, the first antenna 150 is illustrated as disposed adjacently to the first edge 321, but this is only one example for explanation, and the antenna may be disposed adjacently to at least one of the first edge 321, the second edge 322, the third edge 323, the fourth edge 324, the fifth edge 325, and the sixth edge 326. For another example, an antenna embodiment is not limited to a shape and size of the first antenna 150, and may have a shape and size of an antenna that will be described later in FIG. 9A, FIG. 9B, FIG. 9C and/or FIG. 9D, and may have various other shapes and sizes.

Figure 4:
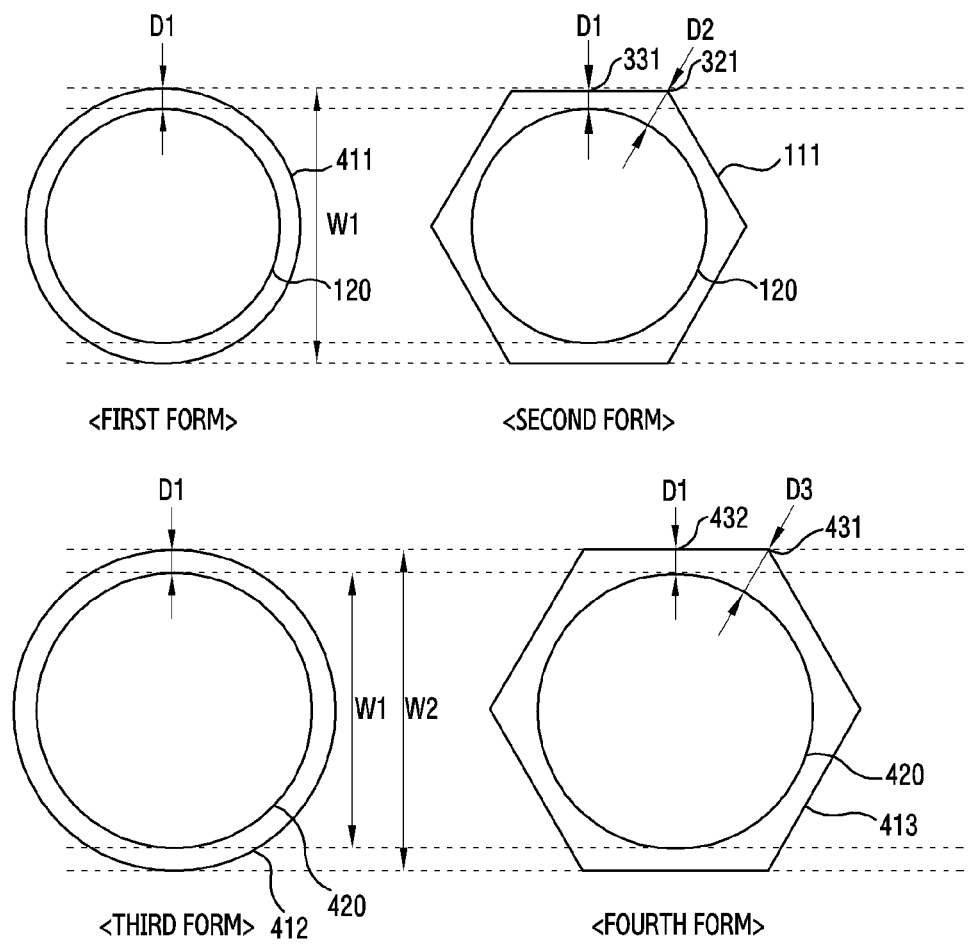
FIG. 4 is a diagram illustrating housings of a first form, a second form, a third form and a fourth form.

FIG. 4 is a diagram illustrating housings of a first form, a second form, a third form and a fourth form.

Referring to FIG. 4, according to an embodiment, the housing 111 of the second form may be referred to as the first housing 111 illustrated in FIG. 3. In an embodiment, a distance from the first point 331 of the housing 111 of the second form to the support member 120 may correspond to a first separation distance (D1), and a distance from the first edge 321 of the housing 111 of the second form to the support member 120 may correspond to a second separation distance (D2). According to an embodiment, a width of the housing 111 of the second form may have a first length (W1) that is substantially the same as that of the housing 411 of the first form. Accordingly, the housing 111 of the second form may have a larger separation distance (e.g., the second separation distance (D2)) compared to the same width length (e.g., the first length (W1)), when compared with the housing 411 of the first form.

According to an embodiment, the housing 413 of the fourth form may have a hexagonal pillar shape, and may have a width length of a second length (W2), when compared with the housing 111 of the second form having the width length of the first length (W1). According to an embodiment, a distance from a second point 432 of the housing 413 of the fourth form to the support member 420 of the third form may correspond to the first separation distance (D1). A distance from a second edge 431 of the housing 413 of the fourth form to the support member 420 of the third form may correspond to a third separation distance (D3). According to an embodiment, when compared with the housing 412 of the third form, the housing 413 of the fourth form may have a larger separation distance (e.g., the third separation distance (D3)) compared to the same width length (e.g., the second length (W2)).

Accordingly, an antenna disposed along a housing (e.g., the housing 111 of the second form) including at least one edge may secure a separation distance from the larger support member 120, compared to an antenna disposed along a cylindrical housing (e.g., the housing 411 of the first form).

Figure 5A:
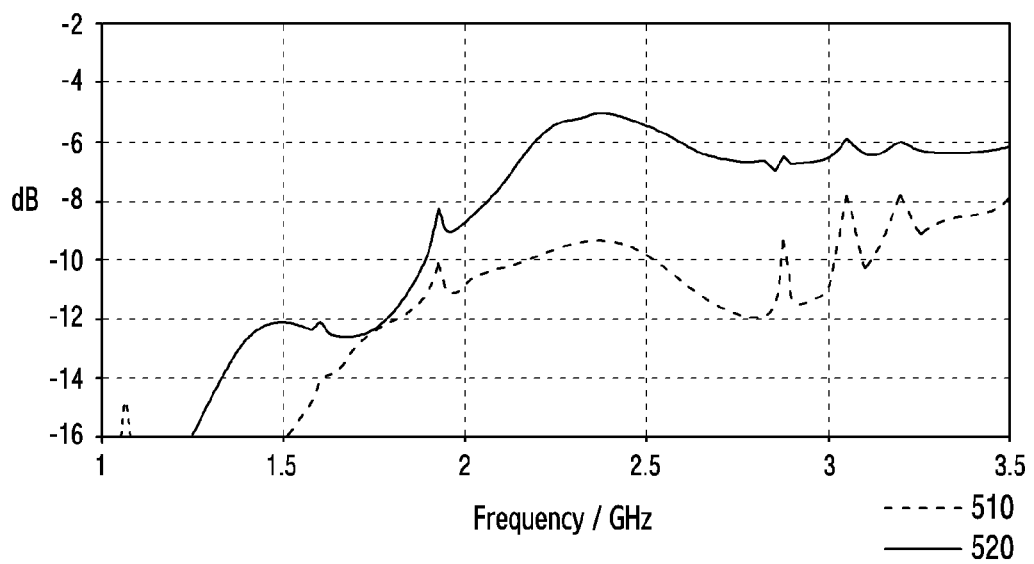
FIG. 5A is a diagram illustrating a radiation efficiency graph of an antenna disposed in a housing of a first form and a radiation efficiency graph of an antenna disposed in a housing of a second form.

FIG. 5A is a diagram illustrating a radiation efficiency graph of an antenna disposed in a housing of a first form and a radiation efficiency graph of an antenna disposed in a housing of a second form.

Figure 5B:
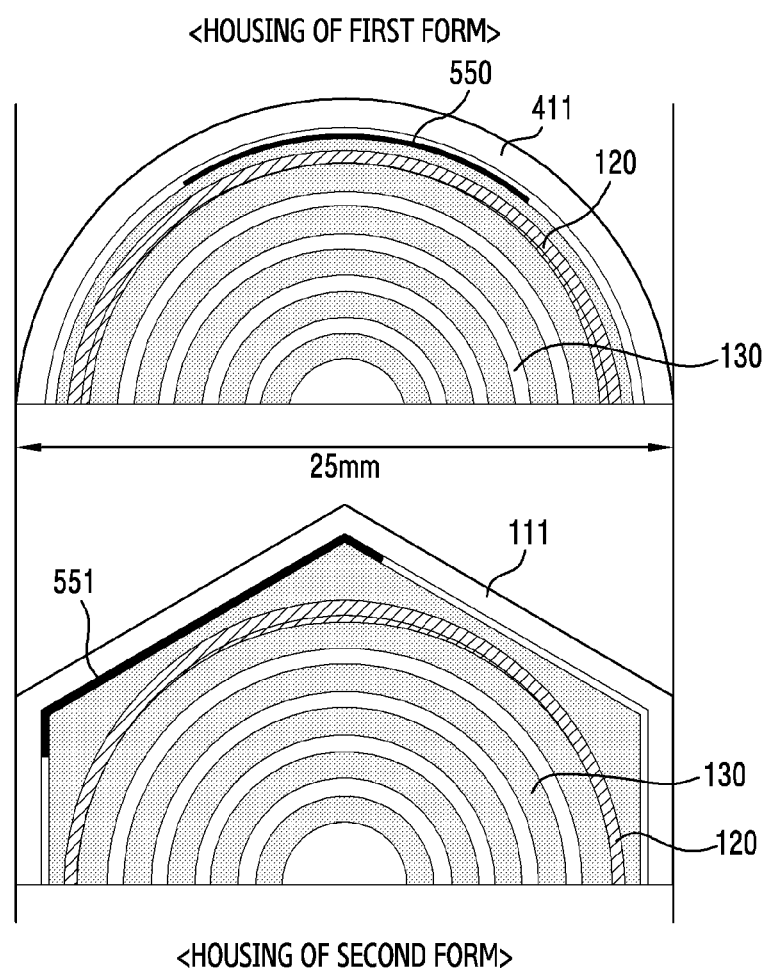
FIG. 5B is a diagram illustrating arrangement structures of antennas disposed in a housing of a first form and a housing of a second form.

FIG. 5B is a diagram illustrating arrangement structures of antennas disposed in the housing of the first form and the housing of the second form.

Referring to FIG. 5A and FIG. 5B, according to an embodiment, an antenna 551 of the second form may be disposed in the housing 111 of the second form. An antenna 550 of the first form and the antenna 551 of the second form may have substantially the same electrical length, and antenna arrangement structures dependent on the forms of the housings 111 and 411 are different, but may transmit and/or receive a signal of the substantially same frequency band. For example, the antenna 550 of the first form and the antenna 551 of the second form have different antenna forms according to the forms of the housings 111 and 411, but may be referred to as antennas transmitting and/or receiving the signal of the substantially same frequency band.

According to an embodiment, the housing 111 of the second form may have the same width length (e.g., 25 mm) as the housing 411 of the first form.

According to an embodiment, the antenna 551 of the second form may secure a larger separation distance from the supporting member 120, compared to the antenna 550 of the first form. Through this, the electronic device 100 may prevent or reduce a deterioration of antenna radiation performance caused by an interference of an electric current flowing through the antenna 551 of the second form with the support member 120. Accordingly, a radiation efficiency graph 520 (hereinafter, a second graph) of the antenna 551 of the second form disposed in the housing 111 of the second form has a high radiation efficiency at a frequency band of about 1 to 3.5 GHz.

On the other hand, a radiation efficiency graph 510 (hereinafter, a first graph) of the antenna 550 of the first form disposed in the housing 411 of the first form has a low radiation efficiency at the frequency band of about 1 to 3.5 GHz.

Figure 6:
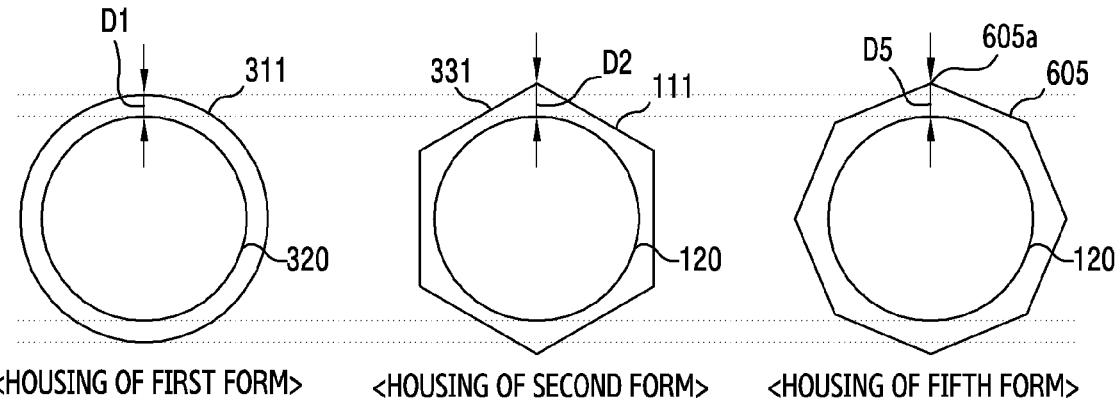
FIG. 6 is a diagram illustrating housings of various forms.
Figure 6:
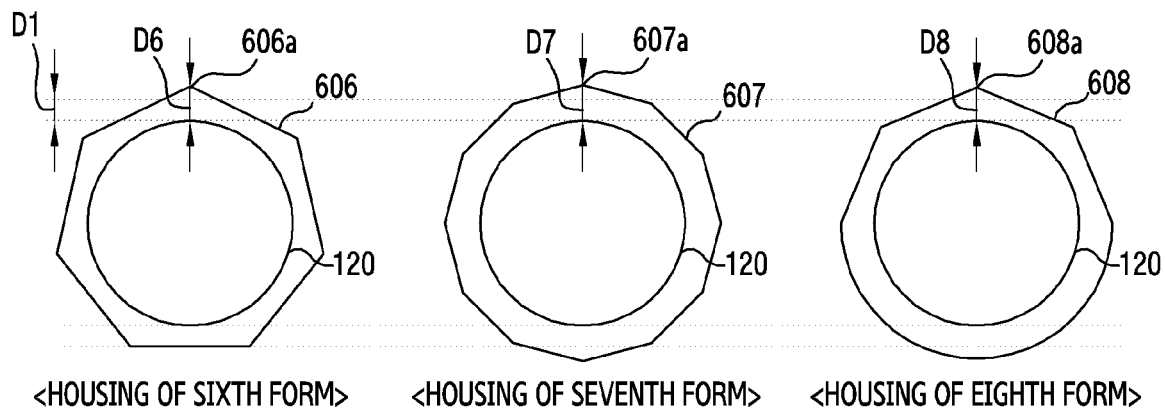
Figure 6:
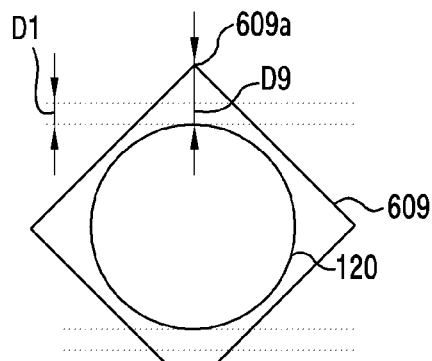

FIG. 6 is a diagram illustrating housings of various forms.

According to an embodiment, the housing 111 of the second form having six edges may have a larger separation distance (e.g., the second separation distance (D2)) compared to the housing 411 of the first form. For another example, a housing having at least one edge may have a larger separation distance than the housing 411 of the first form.

For example, a housing 605 of a fifth form having eight edges may have a fifth separation distance (D5) greater than the first separation distance (D1). The fifth separation distance (D5) may mean a distance from a fifth edge 605a to the support member 120. For another example, a housing 606 of a sixth form having seven edges may have a sixth separation distance (D6) greater than the first separation distance (D1). The sixth separation distance (D6) may mean a distance from a sixth edge 606a to the support member 120. For further example, a housing 607 of a seventh form having twelve edges may have a seventh separation distance (D7) greater than the first separation distance (D1). The seventh separation distance (D7) may mean a distance from a seventh edge 607a to the support member 120. For yet another example, a housing 608 of an eighth form having five edges may have an eighth separation distance (D8) greater than the first separation distance (D1). The eighth separation distance (D8) may mean a distance from an eighth edge 608a to the support member 120. For still another example, a housing 609 of a ninth form having four edges may have a ninth separation distance (D9) greater than the first separation distance (D1). The ninth separation distance (D9) may mean a distance from a ninth edge 609a to the support member 120.

In various embodiments, the electronic device may have a cross section of a polygon like the housings of the second to seventh forms. For another example, the electronic device may also have a cross section of an arc shape at least in its one part like the eighth form.

Figure 7:
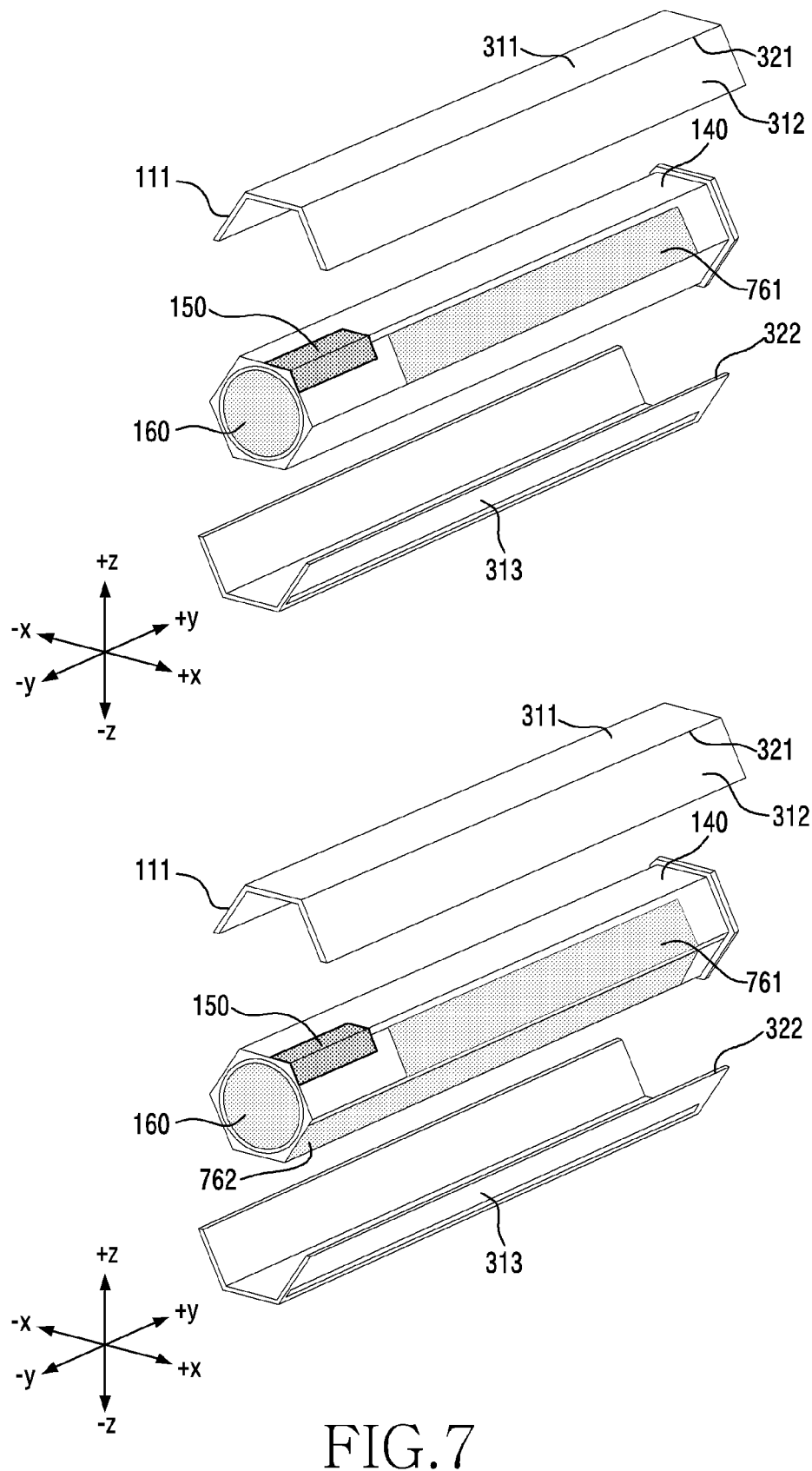
FIG. 7 is a diagram illustrating an additional printed circuit board included in an electronic device according to an embodiment.

FIG. 7 is a diagram illustrating an additional printed circuit board included in an electronic device according to an embodiment.

Referring to FIG. 7, according to an embodiment, the electronic device 100 may include a second printed circuit board 761 and/or a third printed circuit board 762. According to an embodiment, the first part 311 and the second part 312 of the first housing 111 may form a specific angle at the first edge 321, and the second part 312 and the third part 313 may form a specific angle at the second edge 322. In FIG. 7, it is illustrated that the upper housing 111a and the lower housing 111b are separated and do not meet at the second edge 322, but this is for illustrating the inside of the housing, and in an embodiment, the second part 312 and the third part 313 may meet at a specific angle at the second edge 322.

According to an embodiment, the second printed circuit board 761 and/or the third printed circuit board 762 may be disposed between the first housing 111 and the antenna carrier 140. For example, the second printed circuit board 761 may be disposed substantially in parallel to the second part 312, and the antenna carrier 140 may support the second printed circuit board 761.

For another example, the third printed circuit board 762 may be disposed substantially in parallel to the third part 313, and the antenna carrier 140 may support the third printed circuit board 762.

According to an embodiment, a plurality of electronic components may be disposed on the second printed circuit board 761 and/or the third printed circuit board 762. For example, a wireless communication circuit, a processor, a memory, and/or an interface may be disposed on the second printed circuit board 761.

According to another embodiment, the second printed circuit board 761 and/or the third printed circuit board 762 may include a flexible printed circuit board (FPCB) having a bending characteristic.

According to further embodiment, as the first part 311, the second part 312, and/or the third part 313 of the first housing 111 are formed to be flat, the electronic device 100 may include an additional printed circuit board (e.g., the second printed circuit board 761 or the third printed circuit board 762) in the first housing 111. Through this, despite the miniaturization of the electronic device 100, the electronic device 100 may include the additional printed circuit board (e.g., the second printed circuit board 716) on which an integrated circuit for providing various functions will be disposed.

Figure 8:
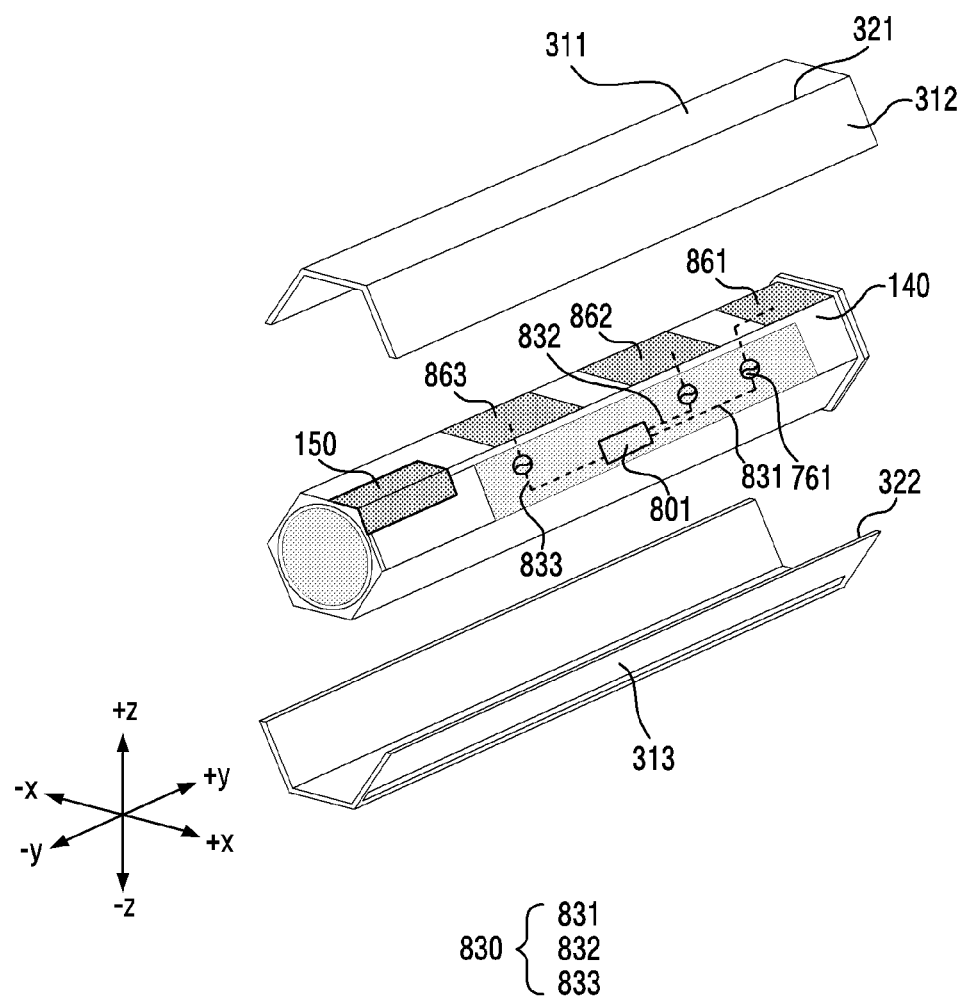
FIG. 8 is a diagram illustrating an electronic device including an additional antenna.

FIG. 8 is a diagram illustrating an electronic device including an additional antenna.

Referring to FIG. 8, according to an embodiment, the electronic device 100 may include a first additional antenna 861, a second additional antenna 862, and/or a third additional antenna 863.

According to an embodiment, the electronic device 100 may include an additional wireless communication circuit 801, and the additional wireless communication circuit 801 may be disposed on the second printed circuit board 761.

According to an embodiment, the first additional antenna 861, the second additional antenna 862 and/or the third additional antenna 863 may be disposed in the housing 110 substantially in parallel to the first part 311 of the first housing 111. For example, the first additional antenna 861, the second additional antenna 862 and/or the third additional antenna 863 may be disposed on the antenna carrier 140. In an embodiment, the first housing 111 may include a non-conductive material in a region corresponding to the first additional antenna 861, the second additional antenna 862, and/or the third additional antenna 863.

According to another embodiment, the first additional antenna 861, the second additional antenna 862 and/or the third additional antenna 863 may be disposed in the housing 110 substantially in parallel to the third part 313.

According to further embodiment, the first additional antenna 861, the second additional antenna 862, and/or the third additional antenna 863 may have substantially the same structure as the first antenna 150. For example, one edge of the first additional antenna 861 may be disposed under the first part 311, and the first additional antenna 861 may be disposed to extend along the first part 311 while passing under the first edge 321 and extending to the second part 312.

According to an embodiment, the additional wireless communication circuit 801 may feed power to the first additional antenna 861, the second additional antenna 862, and/or the third additional antenna 863, and transmit or receive an RF signal of a specified frequency band. For example, the additional wireless communication circuit 801 may feed power to one point of the first additional antenna 861, and transmit or receive an RF signal of a specified frequency band.

According to an embodiment, when feeding power through the additional wireless communication circuit 801, the electronic device 100 may secure a shorter feeding path than when feeding power through the wireless communication circuit 161 disposed on the first printed circuit board 160. Accordingly, the electronic device 100 may reduce an electrical loss caused by the lengthening of the feeding path.

According to an embodiment, the electronic device 100 may be difficult to secure a feeding path of feeding power from the wireless communication circuit 161 disposed on the first printed circuit board 160 to the first additional antenna 861, the second additional antenna 862, and/or the third additional antenna 863. On the other hand, the electronic device 100 may secure a feeding path 830 connected to the first additional antenna 861, the second additional antenna 862, and/or the third additional antenna 863 through the additional wireless communication circuit 801. For example, the additional wireless communication circuit 801 may feed power to the first additional antenna 861 through a first feeding path 831. For another example, the additional wireless communication circuit 801 may feed power to the second additional antenna 862 through a second feeding path 832. For further example, the additional wireless communication circuit 801 may feed power to the third additional antenna 863 through a third feeding path 833.

Figure 9A:
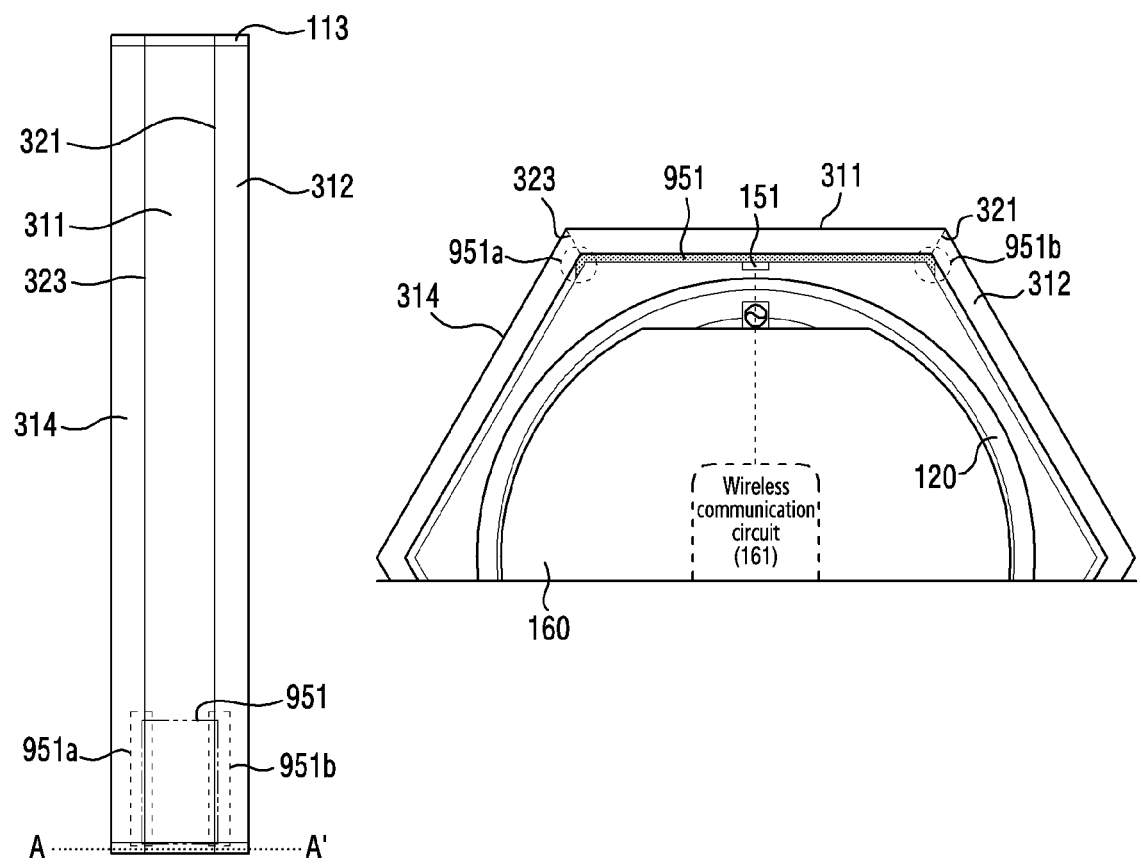
FIG. 9A is a diagram illustrating an arrangement structure of a second antenna.

FIG. 9A is a diagram illustrating an arrangement structure of a second antenna.

Referring to FIG. 9A, according to an embodiment, the first part 311 and the second part 312 of the electronic device 100 may form a specific angle at the first edge 321. For another example, the first part 311 and the fourth part 314 may form a specific angle at the third edge 323.

According to an embodiment, a second antenna 951 disposed in the housing 110 may be disposed on the first part 311. For example, a first edge 951a of the second antenna 951 may be located in adjacent to the third edge 323, and a second edge 951b of the second antenna 951 may be located in adjacent to the first edge 321.

Figure 9B:
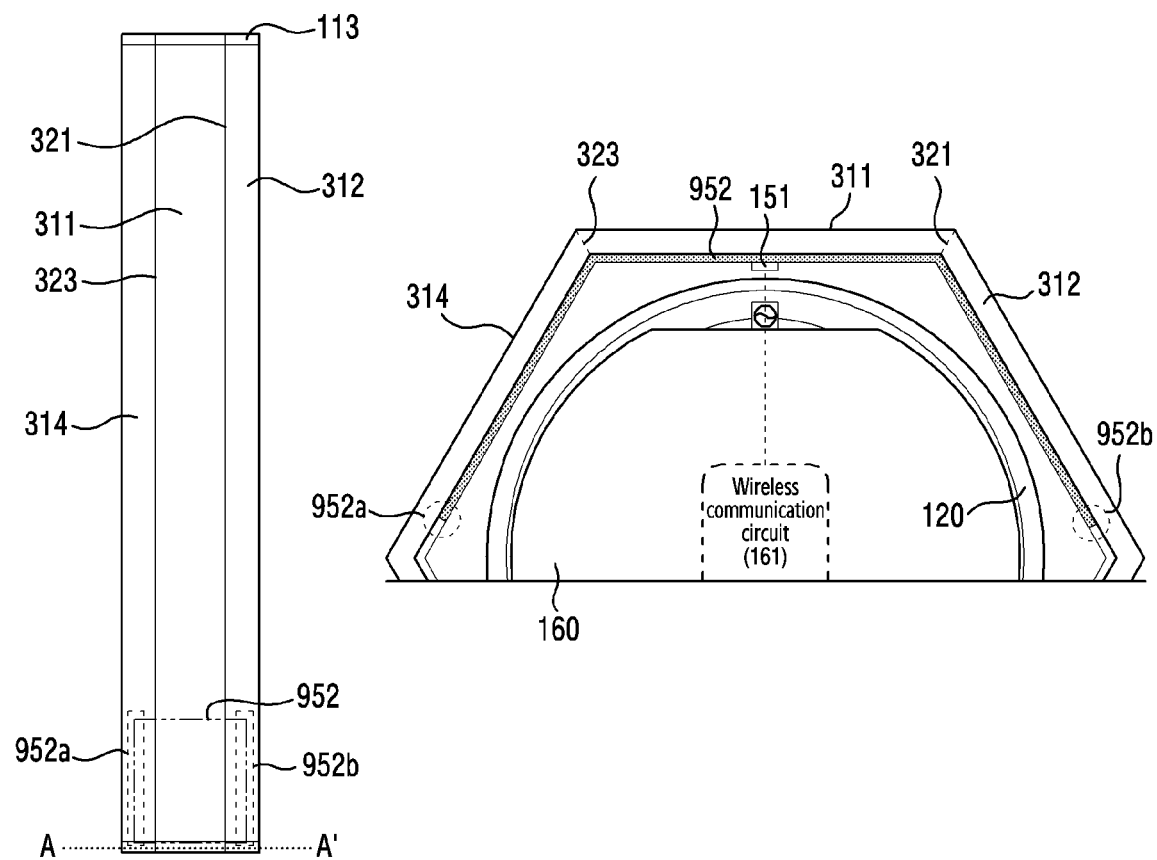
FIG. 9B is a diagram illustrating an arrangement structure of a third antenna.

FIG. 9B is a diagram illustrating an arrangement structure of a third antenna.

Referring to FIG. 9B, according to an embodiment, a third edge 952a of the third antenna 952 may be located under the fourth part 314, and a fourth edge 952b may be located under the second part 312. For example, the third antenna 952 may extend along the fourth part 314 from the third edge 952a, extend along the first part 311 past the third edge 323, and extend to the fourth edge 952b past the first edge 321. For example, the third antenna 952 of FIG. 9B may have relatively more parts located in the second part 312 and the fourth part 314 than the second antenna 951 of FIG. 9A.

Figure 9C:
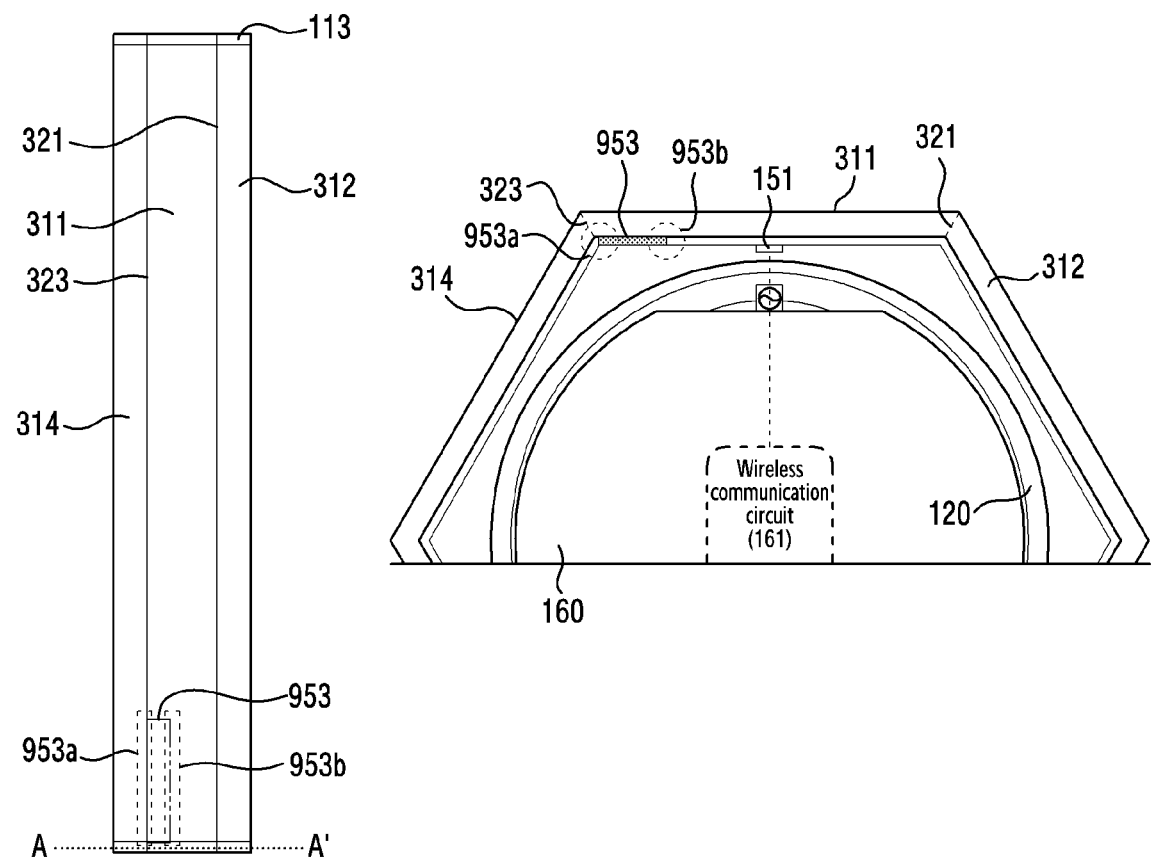
FIG. 9C is a diagram illustrating an arrangement structure of a fourth antenna.

FIG. 9C is a diagram illustrating an arrangement structure of a fourth antenna.

Referring to FIG. 9C, according to an embodiment, a fifth edge 953a and a sixth edge 953b of the fourth antenna 953 may be located under the first part 311, and thus the fourth antenna 953 may be disposed under the first part 311. For example, the fourth antenna 953 may have a maximum separation distance from the support member 120 at the fifth edge 953a.

Figure 9D:
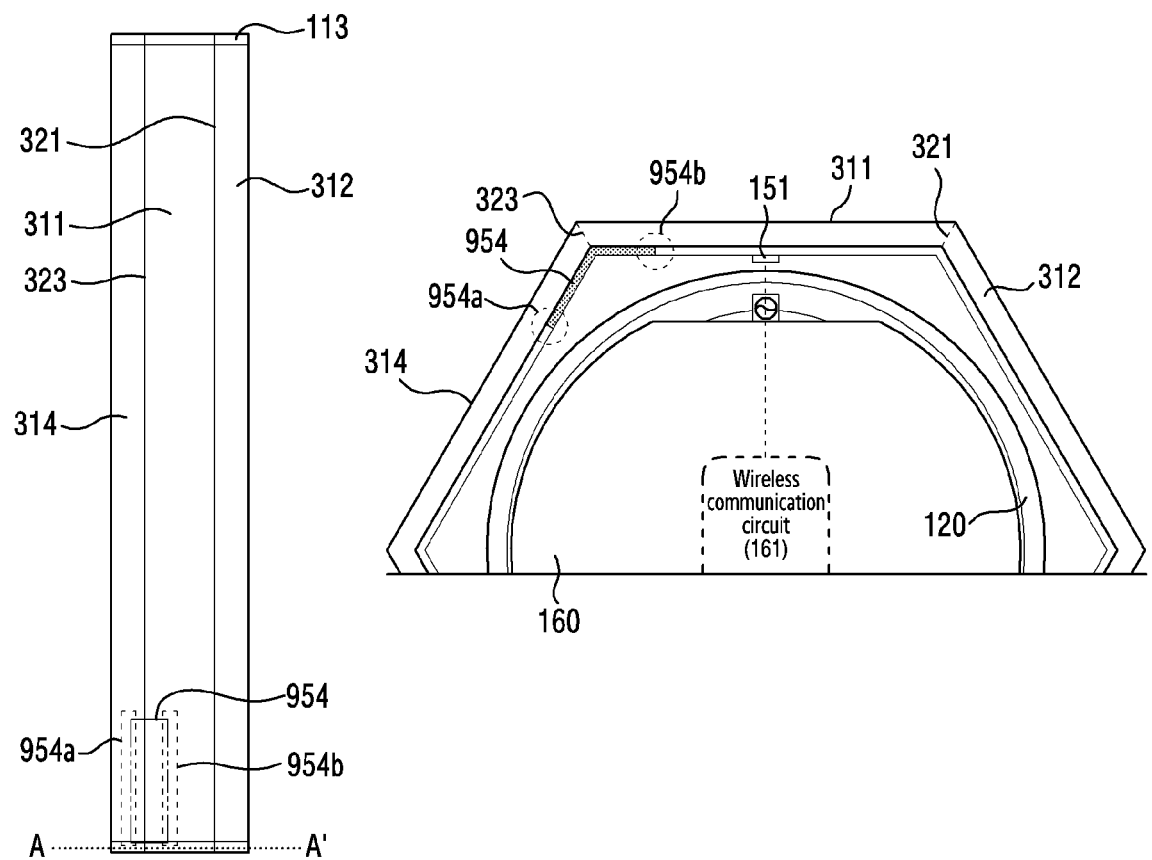
FIG. 9D is a diagram illustrating an arrangement structure of a fifth antenna.

FIG. 9D is a diagram illustrating an arrangement structure of a fifth antenna.

Referring to FIG. 9D, according to an embodiment, a seventh edge 954a of a fifth antenna 954 may be located under the fourth part 314, and an eighth edge 954b may be located under the first part 311. According to an embodiment, the fifth antenna 954 may extend from the seventh edge 954*a* along the fourth part 314 and extend to the eighth edge 954*b* past the third edge 323. For example, in a portion of the fifth antenna 954 located under the third edge 323, the fifth antenna 954 may have a maximum separation distance from the support member 120.

FIG. 9A, FIG. 9B, FIG. 9C and/or FIG. 9D illustrate some of various arrangement structures of the antennas disposed in the housing 110, but are not limited thereto. The antenna disposed in the housing 110 may be disposed adjacently under at least one of six edges of the housing 110. FIG. 9A, FIG. 9B, FIG. 9C and/or FIG. 9D illustrate hexagonal pillars in which the housing 110 has six edges and describe antenna arrangements therefor for description's convenience sake, but a technological spirit disclosed in the present document may be applied to a structure including at least one edge and accordingly, when the structure including the at least one edge is adopted, the antenna may be disposed adjacently under the edge of the structure.

Figure 10A:
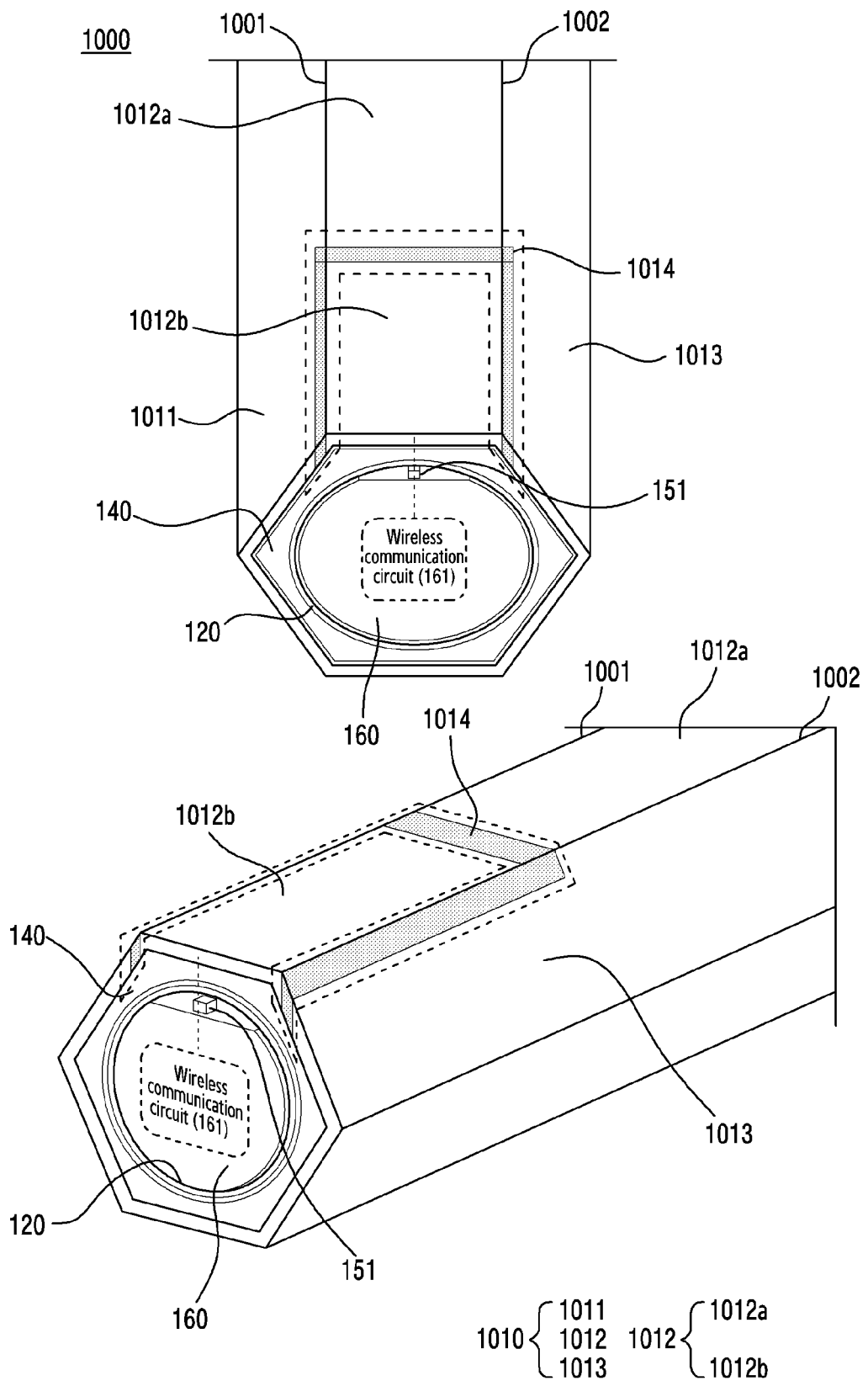
FIG. 10A is a diagram illustrating a housing including an open slot structure according to another embodiment.

FIG. 10A is a diagram illustrating a housing including an open slot structure according to another embodiment.

Referring to FIG. 10A, according to an embodiment, an electronic device 1000 may include a housing 1010 including a metal part. In an embodiment, the housing 110 of the electronic device 100 shown in FIG. 1 may be replaced with the housing 1010 in the electronic device 1000. In an embodiment, the electronic device 1000 may have substantially the same construction as the electronic device 100, but a structure of the housing 1010 and an antenna may be different, and a description of the substantially same construction will be omitted.

According to an embodiment, the housing 1010 may form a side surface among an exterior of the electronic device 1000. In an embodiment, the housing 1010 may have a structure having six edges.

According to another embodiment, the housing 1010 may have a structure having at least one edge. For example, the housing 1010 may have a polygonal structure such as a hexagonal pillar or a pentagonal pillar. For another example, the housing 1010 may have a structure which includes one edge having a cross section of an arc shape.

According to an embodiment, a first part 1011 and a second part 1012 of the housing 1010 may form a specific angle at a first edge 1001. For another example, the second part 1012 may form a specific angle with a third part 1013 at a second edge 1002.

According to an embodiment, the housing 1010 may include a slot structure 1014 in its one part, and one portion of the slot structure 1014 may be formed along the first edge 1001 and the second edge 1002. In an embodiment, the slot structure 1014 may be an open slot structure. For example, the slot structure 1014 may be formed in a conductive part included in the housing 1010.

According to another embodiment, the slot structure 1014 may be disposed along only the first edge 1001, or may be disposed only along the second edge 1002. In this case, the slot structure 1014 may have an open slot structure with one end opened, or have a closed slot structure.

In an embodiment, the wireless communication circuit 161 may feed power to one point of the slot structure 1014, and transmit or receive an RF signal of a specified frequency band. In an embodiment, as one portion of the slot structure 1014 is formed along the first edge 1001, the slot structure 1014 may have a separation distance greater than or equal to a specified distance from the support member 120. The specified distance may mean, for example, a distance having a length of ¼ wavelength of a wavelength corresponding to a frequency band at which a slot antenna having the slot structure 1014 transmits and receives.

In an embodiment, as one portion of the slot structure 1014 is formed along the second edge 1002, the slot structure 1014 may have a separation distance greater than or equal to a specified distance from the support member 120. In an embodiment, the electronic device 1000 may prevent a deterioration of the radiation performance of the slot antenna having the slot structure 1014 by securing a separation distance greater than or equal to a specified distance from the support member including the ground.

On the other hand, a physical length and shape of the slot structure 1014 shown in FIG. 10A is only one example for description's convenience, and the physical length and shape of the slot structure 1014 may be different according to an operation frequency band of the slot antenna having the slot structure 1014.

Figure 10B:
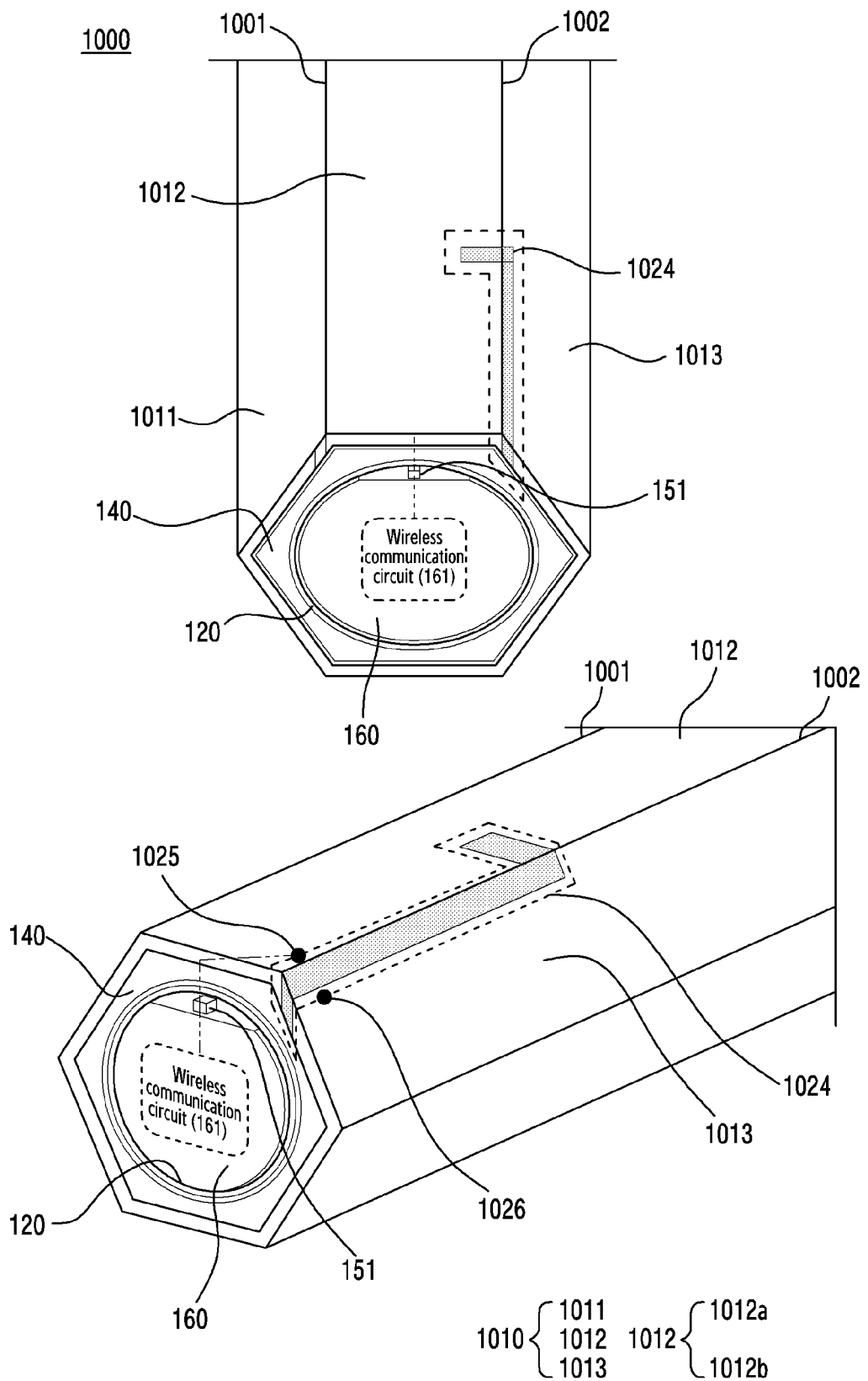
FIG. 10B is a diagram illustrating a housing including a closed slot structure according to another embodiment.

FIG. 10B is a diagram illustrating a housing including a closed slot structure according to another embodiment.

According to an embodiment, the housing 1010 may include a closed slot structure 1024 elongated along the second edge 1002. In an embodiment, the wireless communication circuit 161 may feed power to a first point 1025 of the closed slot structure 1024, and transmit and/or receive an RF signal of a specified frequency band.

According to an embodiment, the first printed circuit board 160 may include a plurality of conductive layers, and at least some of the plurality of conductive layers may include the ground. The closed slot structure 1024 may be electrically connected to the ground of the first printed circuit board 160 at a second point 1026.

According to an embodiment, the electronic device 100 may set different a point (e.g., the second point 1026) at which the closed slot structure 1024 is grounded to the ground and accordingly to this, the closed slot structure 1024 may have various electrical paths. The wireless communication circuit 161 may transmit and/or receive RF signals of frequency bands corresponding to the various electrical paths.

According to another embodiment, the housing 1010 may include an additional closed slot structure elongated along the first edge 1001, and the wireless communication circuit 161 may feed power to one point of the additional closed slot structure, and transmit and/or receive an RF signal of a specified frequency band.

In FIG. 10B, it is illustrated that the closed slot structure 1024 is elongated along the second edge, but this is for description's convenience, and the closed slot structure may be disposed adjacently to at least one of six edges of the housing 1010. Also, a physical length and shape of the closed slot structure 1024 is not limited to a physical length and shape shown in FIG. 10B, and the physical length and shape may be variously deformed according to an operation frequency of a slot antenna having the closed slot structure 1024.

Figure 11:
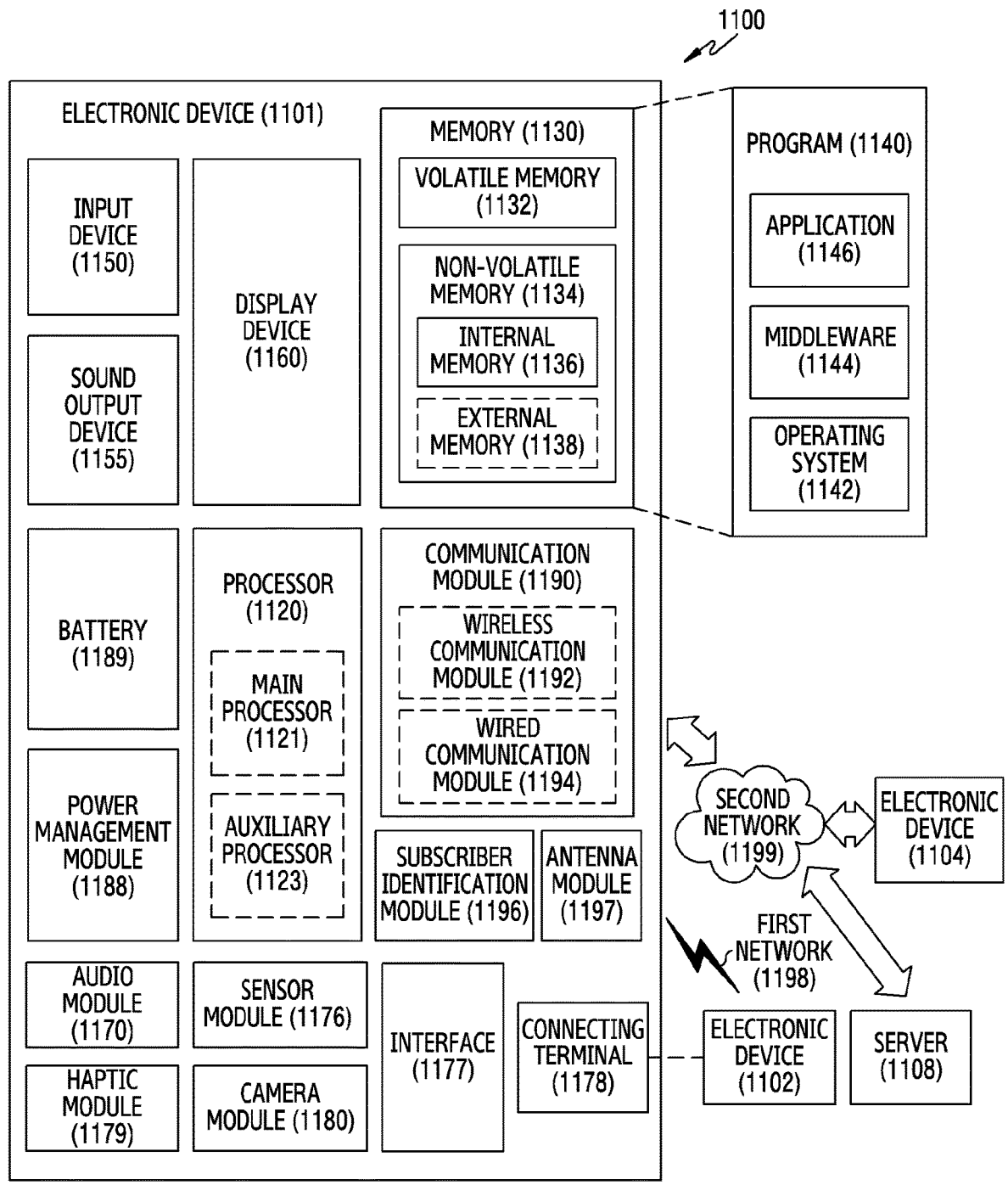
FIG. 11 is a block diagram of an electronic device in a network environment according to various embodiments.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thererto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

An electronic device of an embodiment may include a housing, a cylindrical support member disposed within the housing, a first printed circuit board disposed within the housing, a first antenna disposed within the housing, and a first wireless communication circuit disposed on the first printed circuit board. The housing may include a first surface, a second surface parallel to the first surface, and a side surface surrounding at least one portion of a space between the first surface and the second surface. The side surface may include a first side surface and a second side surface forming an angle with the first side surface at a first edge. The first antenna may be disposed adjacent to at least one portion of the first edge and spaced apart from the cylindrical support member by a predetermined distance or more. The first wireless communication circuit may feed power to the first antenna and transmit and/or receive a signal of a frequency band.

The electronic device of an embodiment may further include a flexible display. The flexible display may be disposed or reside within the cylindrical support member when the electronic device is in a first state, and may be pulled out of or extended from the cylindrical support member as a state of the electronic device is changed from the first state to a second state.

The electronic device of an embodiment may further include a flexible display. The flexible display may be wound along an outer surface of the cylindrical support member and disposed or reside within the housing, when the electronic device is in a first state, and may be unwound along the outer surface of the cylindrical support member and pulled out of or extended from the housing, as a state of the electronic device is changed from the first state to a second state.

The electronic device of an embodiment may further include a second antenna, a second printed circuit board disposed in parallel to the first side surface, and a second wireless communication circuit disposed on the second printed circuit board, and the second wireless communication circuit may feed power to the second antenna.

According to an embodiment, the side surface of the housing may include a third side surface which forms an angle with the second side surface at a second edge, and may further include a second antenna disposed in a region including the second edge to be spaced apart from the cylindrical support member.

According to an embodiment, the cylindrical support member may include the ground.

According to an embodiment, the first antenna may be spaced apart from the ground of the cylindrical support member by a distance of ¼ wavelength ($\lambda/4$) or more of a wavelength corresponding to the frequency band.

According to an embodiment, the first antenna may include a conductive pattern formed by laser direct structuring (LDS).

According to an embodiment, the first antenna may be formed on a flexible printed circuit board (FPCB) disposed in a region including the first edge.

According to an embodiment, the electronic device may further include an antenna carrier disposed between the housing and the cylindrical support member and configured to support the first antenna.

According to an embodiment, an electronic device may include a housing, a cylindrical support member disposed within the housing, a printed circuit board disposed within the housing in parallel to the first surface, an antenna disposed within the housing, and a wireless communication circuit disposed on the printed circuit board. The housing may include a first surface, a second surface parallel to the first surface, and a side surface surrounding the first surface and the second surface. The first surface of the housing may have a first vertex and the second surface may have a second vertex. The side surface may include a first edge connecting the first vertex of the first surface and the second vertex of the second surface corresponding to the first vertex. The antenna may be disposed adjacent to at least one portion of the first edge and spaced apart from the cylindrical support member by a predetermined distance or more. The wireless communication circuit may feed power to the antenna and transmit and/or receive a signal of a frequency band.

According to an embodiment, the first surface of the housing may have six vertices including the first vertex, the second surface of the housing may have six vertices including the second vertex, and the side surface may include six edges connecting the six vertices of the first surface and the six vertices of the second surface, respectively.

According to an embodiment, the first surface may include a first edge extending linearly from the first vertex and a second edge extending curvedly from the first vertex.

The electronic device of an embodiment may further include a flexible display. The flexible display may be disposed or reside within the cylindrical support member when the electronic device is in a first state, and may be pulled out of or extended from the cylindrical support member while a state of the electronic device is changed from the first state to a second state.

According to an embodiment, the cylindrical support member may include the ground, and the antenna may be spaced apart from the ground by a distance of ¼ wavelength ($\lambda/4$) or more of a wavelength corresponding to the specified frequency band.

An electronic device of an embodiment may include a metal housing, a cylindrical support member disposed within the metal housing, a printed circuit board disposed in parallel to the first surface within the metal housing, and a wireless communication circuit disposed on the printed circuit board. The metal housing may include a first surface, a second surface parallel to the first surface, and a side surface surrounding at least one portion of a space between the first surface and the second surface. The side surface may include a first side surface and a second side surface forming an angle with the first side surface at a first edge. A first part of the metal housing including the first edge may be spaced apart from the cylindrical support member. The wireless communication circuit may feed power to the first part and transmit and/or receive a signal of a specified frequency band.

According to an embodiment, a side surface of the metal housing may further include a third side surface, and the second side surface and the third side surface may surround one portion of a space between the first surface and the second surface and form a specific angle at a second edge, and a region of the metal housing including the second edge may include a slot structure.

The electronic device of an embodiment may further include a flexible display. The flexible display may be disposed or reside within the cylindrical support member when the electronic device is in a first state, and may be pulled out of or extended from the cylindrical support member while the electronic device is changed from the first state to a second state.

According to an embodiment, the cylindrical support member may include the ground.

According to an embodiment, a first part of the metal housing may be spaced apart from the ground of the cylindrical support member by a distance of ¼ wavelength ($\lambda/4$) or more of a wavelength corresponding to the frequency band.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing including a first face, a second face parallel to the first face, and a side face surrounding at least one portion of a space between the first face and the second face, wherein the side face includes a first side face and a second side face forming an angle with the first side face, and wherein the first side face and the second side face are connected at a first edge of the housing;
a flexible display;
a support member disposed in the housing, wherein at least one portion of the flexible display is disposed in the support member;
a first printed circuit board disposed in the housing;
a first antenna disposed in the housing; and
a first wireless communication circuit disposed on the first printed circuit board,
wherein the support member includes a conductive member corresponding to a ground for the first antenna,
wherein the first antenna is disposed adjacent to at least one portion of the first edge and s paced apart from the support member, and
wherein the first wireless communication circuit is configured to:
feed power to the first antenna, and
transmit and/or receive a signal of a frequency band via the first antenna.

2. The electronic device of claim 1,
wherein the flexible display is disposed in the support member when the electronic device is in a first state, and
wherein the flexible display is pulled out of the support member as a state of the electronic device is changed from the first state to a second state.

3. The electronic device of claim 1, further comprising:
a second antenna disposed parallel to the first side face;
a second printed circuit board disposed parallel to the second side face; and
a second wireless communication circuit disposed on the second printed circuit board, and configured to feed power to the second antenna.

4. The electronic device of claim 1, wherein the side face of the housing includes a third side face that forms an angle with the second side face and is connected to the second side face at a second edge of the housing, and
wherein the electronic device further includes a second antenna disposed adjacent to the second edge and spaced apart from the support member.

5. The electronic device of claim 1, further comprising:
a second antenna disposed below the first side face, the second side face and the first edge.

6. The electronic device of claim 1, wherein the first antenna is spaced apart from the conductive member of the support member by a distance of ¼ wavelength ($\lambda/4$) of a wavelength corresponding to the frequency band.

7. The electronic device of claim 1, wherein the first antenna includes a conductive pattern formed by laser direct structuring (LDS).

8. The electronic device of claim 1, further comprising:
a flexible printed circuit board (FPCB) disposed in the housing to correspond to the first edge of the housing, wherein the first antenna is formed in the FPCB.

9. The electronic device of claim 1, further comprising:
an antenna carrier disposed between the housing and the support member and configured to support the first antenna,
wherein the housing further includes a second edge in which the second side face and a third side face of the housing are connected,
wherein a portion of a slot is formed along with the second edge, and
wherein the first wireless communication circuit is configured to transmit and/or receive a signal of a specific frequency band using the slot.

10. The electronic device of claim 1, wherein the first printed circuit board has a circular shape, and
wherein the first printed circuit board is disposed parallel to the first face.

11. An electronic device comprising:
a housing comprising a first face, a second face parallel to the first face, and a side face surrounding at least one portion of a space between the first face and the second face;
a flexible display;
a support member disposed in the housing, wherein at least one portion of the flexible display is disposed in the support member;
a printed circuit board disposed in the housing in parallel to the first face;
an antenna disposed in the housing; and
a wireless communication circuit disposed on the printed circuit board,
wherein the first face of the housing includes a first vertex and the second face of the housing includes a second vertex,
wherein the side face includes a first edge connecting the first vertex and the second vertex,
wherein the antenna is disposed adjacent to at least one portion of the first edge and spaced apart from the support member,
wherein the support member includes a conductive member corresponding to a ground for the antenna, and
wherein the wireless communication circuit is configured to:
feed power to the antenna and transmit and/or receive a signal of a frequency band via the antenna.

12. The electronic device of claim 11, wherein the first face of the housing includes six vertices including the first vertex,
wherein the second face of the housing includes six vertices including the second vertex, and
wherein the side face includes six edges connecting the six vertices of the first face and the six vertices of the second face, respectively.

13. The electronic device of claim 11, wherein the first face includes:
a first edge extending linearly from the first vertex, and
a second edge extending curvedly from the first vertex.

14. The electronic device of claim 11,
wherein the flexible display is
disposed in the support member when the electronic device is in a first state, and
wherein the flexible display is pulled out of the support member while a state of the electronic device is changed from the first state to a second state.

15. The electronic device of claim 11, wherein:
the antenna is spaced apart from the conductive member by a distance of ¼ wavelength (λ/4) of a wavelength corresponding to a frequency band.

16. An electronic device comprising:
a metal housing including a first face, a second face parallel to the first face, and a side face surrounding at least one portion of a space between the first face and the second face, wherein the side face includes a first side face and a second side face forming an angle with the first side face, and wherein the first side face and the second side face are connected at a first edge of the metal housing;
a flexible display;
a support member disposed in the metal housing, wherein at least one portion of the flexible display is disposed in the support member;
a printed circuit board disposed in parallel to the first face in the metal housing; and
a wireless communication circuit disposed on the printed circuit board,
wherein a first part of the metal housing including the first edge is spaced apart from the support member,
wherein the support member includes a conductive member corresponding to a ground for the first part, and
wherein the wireless communication circuit is configured to:
feed power to the first part, and
transmit and/or receive a signal of a frequency band via the first part.

17. The electronic device of claim 16, wherein
the side face of the metal housing further includes a third side face,
wherein the second side face and the third side face surround a portion of the space between the first face and the second face and form an angle at a second edge of the metal housing, and
wherein a region of the metal housing including the second edge includes a slot structure.

18. The electronic device of claim 16,
wherein the flexible display is
disposed in the support member when the electronic device is in a first state, and
wherein the flexible display is pulled out of the support member while a state of the electronic device is changed from the first state to a second state.

19. The electronic device of claim 16, wherein the metal housing has a hexagonal pillar shape, and
wherein the support member has a cylindrical shape.

20. The electronic device of claim 16, wherein a first part of the metal housing is spaced apart from the conductive member of the support member by a distance of ¼ wavelength (λ/4) of a wavelength corresponding to the frequency band.

* * * * *